United States Patent
Yakovchev et al.

(10) Patent No.: US 11,572,967 B2
(45) Date of Patent: Feb. 7, 2023

(54) APPARATUS AND METHOD FOR LINED PIPE WELDING

(71) Applicant: MaxTube Limited, Aberdeen (GB)

(72) Inventors: Encho Yakovchev, Aberdeen (GB); Martin Bremner, Aberdeen (GB); Johannes Straub, Newport (AU); Roderick Sweeting, East Ryde (AU); Rowan Paton, Brighton (AU)

(73) Assignee: MaxTube Limited, Aberdeen (GB)

( * ) Notice: Subject to any disclaimer, the term of this patent is extended or adjusted under 35 U.S.C. 154(b) by 421 days.

(21) Appl. No.: 16/368,254

(22) Filed: Mar. 28, 2019

(65) Prior Publication Data
US 2019/0301646 A1 Oct. 3, 2019

(30) Foreign Application Priority Data
Mar. 29, 2018 (GB) ..................... 1805259

(51) Int. Cl.
*F16L 13/02* (2006.01)
*F16L 58/18* (2006.01)
*B23K 37/053* (2006.01)
*F16L 13/013* (2006.01)

(52) U.S. Cl.
CPC ...... *F16L 13/0263* (2013.01); *B23K 37/0531* (2013.01); *F16L 13/0227* (2013.01); *F16L 58/181* (2013.01); *F16L 13/013* (2013.01)

(58) Field of Classification Search
CPC . F16L 13/0227; F16L 13/0263; F16L 58/181; F16L 55/163
USPC ....................... 285/22, 293.1, 370
See application file for complete search history.

(56) References Cited

U.S. PATENT DOCUMENTS

| | | | | |
|---|---|---|---|---|
| 1,920,449 A * | 8/1933 | Unke | .................. | F16L 13/0227 285/22 |
| 2,448,107 A * | 8/1948 | Mattimore | .......... | F16L 13/0227 285/22 |
| 2,764,426 A * | 9/1956 | Ahrens | ............... | F16L 13/0227 285/22 |
| 3,508,766 A * | 4/1970 | Berg | .................. | F16L 13/0263 285/370 |
| 4,197,880 A | 4/1980 | Cordia | | |
| 5,002,317 A | 3/1991 | Burkit | | |

(Continued)

FOREIGN PATENT DOCUMENTS

DE 24 40 086 A1 3/1976

OTHER PUBLICATIONS

PCT International Search Report and Written Opinion dated Jun. 17, 2019 in International Patent Application No. PCT/GB2019/050900, filed Mar. 28, 2019.

*Primary Examiner* — Zachary T Dragicevich
(74) *Attorney, Agent, or Firm* — Foley & Lardner LLP (57) ABSTRACT

A joining sleeve configured to connect internal liners of two internally lined pipe sections across a welded pipe section joint and a method of use is disclosed. The joining sleeve comprises a sleeve body having a first end and a second end, the first and second ends configured to couple with opposing ends of first and second internal liners respectively. A collar is disposed around the outer surface of the sleeve body, the collar having a first retracted condition in which it has a first outer diameter, and a second expanded condition in which it has a second outer diameter, larger than the first outer diameter.

22 Claims, 8 Drawing Sheets

(56) References Cited

U.S. PATENT DOCUMENTS

| | | | | |
|---|---|---|---|---|
| 5,346,261 A | * | 9/1994 | Abbema | F16L 13/0263 |
| | | | | 285/22 |
| 5,685,572 A | * | 11/1997 | Linton | F16L 13/0263 |
| | | | | 285/370 |
| 6,240,965 B1 | * | 6/2001 | Maimets | F16L 55/163 |
| 2004/0070199 A1 | * | 4/2004 | Trivelli | F16L 13/0263 |
| 2005/0006899 A1 | * | 1/2005 | Lewis | F16L 13/0227 |
| | | | | 285/370 |
| 2006/0145479 A1 | * | 7/2006 | McIntyre | F16L 13/0263 |
| | | | | 285/370 |
| 2008/0193221 A1 | | 8/2008 | Lee et al. | |
| 2016/0168719 A1 | * | 6/2016 | Chuyko | F16L 13/0263 |

* cited by examiner

APPARATUS AND METHOD FOR LINED PIPE WELDING

The present invention relates to an apparatus and method of use for lined pipe welding operations, and in particular to a joining sleeve configured to connect internal liners of two internally lined pipe sections across a welded pipe section joint, and a method of use.

BACKGROUND TO THE INVENTION

In the field pipeline engineering, it is well known to coat or to line the inside of pipelines with materials which are able to withstand the damaging properties of corrosive pipeline fluids, to protect the pipelines from corrosion and the like. One such method is to provide a corrosion resistant liner inside a pipeline. Typically, such a liner is separated from the inner surface of the pipeline by a layer of grout or cement.

As pipelines are made up from numerous pipeline sections, joints between the sections must also be adequately protected from the damaging properties of the contained fluids. One of the most common methods of joining pipeline sections is by welding. However, welding processes can damage the corrosion resistant liners of the pipeline sections in the vicinity of the weld due to, not least, the high temperatures involved. Internal liners of pipeline sections will therefore be rebated from the ends of the pipeline sections by a distance which is sufficient to protect them from the heat of the welding operation. Sleeves or inserts are used to join the rebated ends of the liners across the weld seam. Due to their placement adjacent the weld, the sleeves or inserts must prevent or reduce heat transfer to the liners, and must themselves be resistant to the heat of the welding operation.

US 2002/0125295 describes a device which is used to facilitate the connection between two pipeline sections having rebated internal fiberglass liners. The device described in US 2002/0125295 has a body which engages the liners of the two pipes. The device is also provided with a layer of insulating material on its outer surface, which lies adjacent to the joining location of the external pipe sections to be welded. The purpose of the insulating material is to prevent the transfer of heat to the body of the device and to the pipe liners that are joined.

SUMMARY OF THE INVENTION

It is desirable to be able to join pipeline sections by welding, without causing damage to their internal corrosion resistant liners and while facilitating a connection between said liners to ensure that the pipeline remains protected.

It is amongst the aims and objects of the invention to provide a device for use in joining the liners of internally lined pipe sections, during a welding operation, which is an effective alternative to those devices that have been proposed before, or which addresses one or more of the problems of known apparatus and methods.

It is amongst the aims and objects of the invention to provide an apparatus and method of use for connecting the internal liners of two internally lined pipe sections in welding operations, which obviates or mitigates one or more drawbacks or disadvantages of known apparatus and methods.

It is amongst the aims and objects of the invention to provide an apparatus and method of use for connecting the internal liners of two internally lined pipe sections in welding operations, which provides improved protection to the internal liners of the pipe sections from the welding operation.

Further aims and aspects of the invention will become apparent from the following description.

According to a first aspect of the invention, there is provided a joining sleeve configured to connect internal liners of two internally lined pipe sections across a welded pipe section joint, the joining sleeve comprising:
a sleeve body having a first end and a second end, the first and second ends configured to couple with opposing ends of first and second internal liners respectively; and
a collar disposed around the outer surface of the sleeve body, the collar having a first retracted condition in which it has a first outer diameter, and a second expanded condition in which it has a second outer diameter, larger than the first outer diameter.

The joining sleeve may be used with internally lined pipe sections which may each comprise an internal liner within the internal wall of its respective pipe section. The internal liner may be separated from an inner surface of the respective pipe section by a layer of cement, or grout, or any other suitable material. The pipe sections may be steel pipe sections and the internal liners may be corrosion resistant liners. In a preferred embodiment, the internal liners are glass-epoxy liners.

The joining sleeve may therefore provide a connection between internal liners that are rebated from the end of the pipeline sections, and may be configured to protect the internal liners during a welding operation.

The joining sleeve may be formed from a material of greater heat resistance than the material of the liners. The joining sleeve may comprise thermal insulation, which may protect one or more components of the sleeve itself and which may reduce or prevent heat transfer to the liners via the joining sleeve, providing additional protection of the liners from the high temperatures experienced during the welding operation. Alternatively, or in addition, the joining sleeve may be configured to provide a physical barrier or impediment between weld materials and one or more components of the sleeve and/or the internal liners. The sleeve may therefore function to provide protection from the "weld pool", which may comprise molten weld metal (which may include molten steel) that is generated as a result of the welding operation.

The sleeve body may be substantially tubular, and/or may comprise a polymer. The sleeve body may be formed by an injection moulding process. Alternatively, the sleeve body may be formed by any other suitable process, or by a combination of processes. For example, the sleeve body may be formed by machining.

The collar may be configured to protect one or more components of the joining sleeve and/or the internal liners during a welding operation. The collar may also function to provide thermal insulation, which may protect one or more components of the joining sleeve and/or the liners from the high temperatures experienced during the welding operation. Alternatively, or in addition, the collar may be configured to provide a physical barrier or impediment between weld materials and one or more components of the joining sleeve and/or the internal liners, for example by providing protection from the "weld pool", which may comprise molten weld metal (which may include molten steel) that is generated as a result of the welding operation.

The joining sleeve may comprise an insulating layer, which may be disposed around an outer surface of the sleeve body. Preferably, the insulating layer comprises a layer of thermally insulating material.

An outer surface of the sleeve body may comprise a circumferential recess, which may be centrally disposed along the longitudinal axis of the body.

The insulating layer may be located within the circumferential recess. The insulating layer may be between 1 mm and 10 mm thick. Preferably, the insulating layer is between 4 mm and 6 mm thick. The insulating layer may comprise any suitable high temperature insulating material, for example the material sold under the brand name Pyrogel® XTE by Aspen Aerogels. The insulating layer may be configured to expand, at least in a radial direction of the joining sleeve. The insulating layer may be configured to expand on exposure to heat and may expand when the layer reaches a specific temperature.

Where the sleeve is provided with an insulating layer, the collar may be disposed around the outer surface of the sleeve body, and may at least partially overlay the insulating layer. The collar may be disposed on the sleeve body at a location proximate the location of weld between mating ends of two pipe sections, such that the collar may be disposed between the weld and the sleeve body.

The collar may comprise a split ring. The collar may have a length in a circumferential direction which is greater than the circumference of the collar, such that the collar comprises an overlap in a circumferential direction. The collar may be, for example, between 20 mm and 150 mm wide (in a longitudinal direction of the sleeve). The collar may comprise a joggled section, which may comprise a first end section of the collar being radially offset with respect to a second end section of the collar. This may allow the overlap to be disposed internally of the ring. The joggle may be achieved by bends in one end section of the collar. The collar may be formed to have a substantially flush outer surface. First and second end sections of the collar may define first and second outer surfaces respectively, wherein the first and second outer surfaces may be substantially flush with one another.

The overlap may account for the change in outer diameter of the collar to an increased outer diameter without providing a gap in the collar in a circumferential direction. In its first, retracted condition, the overlap in the collar material may be relatively large, and in its second, expanded condition, the overlap in the collar material may be relatively small. The overlapping section of material may be an overlap of at least 5 mm.

The collar may be biased towards its second, expanded condition. In its first, retracted condition, the collar may have an inner diameter which is close to the outer diameter of the part of the joining sleeve body on which it is disposed, and/or of the insulating layer.

Alternatively, or in addition, in its first, retracted condition, the collar may have an outer diameter which is close to the maximum outer diameter of the tubular body of the sleeve, around which it is positioned and/or of the insulating layer. In its first, retracted condition, the collar may have an outer diameter which is flush with the maximum outer diameter of the tubular body of the sleeve, around which it is positioned, and/or of the insulating layer. In its second, expanded condition, the collar may have an outer diameter which is close to the inner diameter of the pipe sections. The collar may be located within a circumferential recess in the centre of the body of the sleeve. The collar may be positioned over the insulating layer, which may be located in the circumferential recess in the centre of the body.

The collar may further comprise at least one formation to engage respective ends of the split ring together. The at least one formation may comprise a projection, groove, ridge, indentation, recess and/or fold in the collar. The formation may comprise a projection upstanding from an outer surface of the collar. Alternatively, or in addition, the formation may comprise an indentation recessed into an inner surface of the collar. Preferably, the formation comprises a continuous projection from an outer surface of the collar, and a continuous recess in the inner surface of the collar. The outer surface of the projection may be configured to locate in an inner surface of the recess at the collar overlap.

The at least one formation may comprise a plurality of formations, axially spaced apart on the collar. In an overlapping section of the collar, opposing ends of the formation may cooperate with one another. For example, a projecting formation may sit within the corresponding recess of the formation in the collar overlap.

The at least one formation may facilitate the alignment of the collar, for example by encouraging respective ends of the split ring to remain aligned with one another. They may also assist in providing the collar with additional stiffness, for example stiffness against radial compression.

In its first, retracted condition, the collar may be of a sufficiently small diameter, such that the sleeve is able to be inserted inside the inner surfaces of the walls of the pipe sections. In its first, retracted condition, the collar may be of a sufficiently small diameter such that it may not come in to substantial contact the inner surfaces of the walls of the pipe sections during or after installation, in its first retracted condition. By substantial contact, it is meant contact which would hinder or prove to be an obstacle to the insertion of the sleeve within the pipe sections, or that which would cause damage to the joining sleeve or its components.

In its second, expanded condition, the outer diameter of the collar is increased. The diameter of the collar may be increased until the collar material reaches a state of equilibrium. The natural, equilibrium diameter may be smaller than that of the inner surfaces of the walls of the pipe sections. Alternatively, the diameter of the collar may be increased such that it comes into contact with the inner surfaces of the walls of the pipe sections in use. The natural, equilibrium diameter of the collar may be greater than that of the inner surfaces of the walls of the pipe sections such that the collar exerts a force on the inner surfaces of the walls of the pipe sections. The at least one formation may be configured to come into contact with the inner surfaces of the pipe sections when the collar is in its second, expanded condition. Where the collar comprises formations upstanding from the outer surface of the collar, the formations may be configured to come into contact with the inner surfaces of the walls of the pipe sections. This may produce a gap between the outer surface of the collar and the inner surfaces of the walls of the pipe sections. The gap may be an air gap. In addition, a gap may be produced between the outer surface of the joining sleeve body and the inner surface of the collar. The gap may be an air gap.

The collar may be biased from its retracted position towards its second, expanded condition. The collar may be biased by material properties of the collar, for example its stiffness.

Where the sleeve is provided with an insulating layer, an air gap may be produced between the outer surface of the body with the insulating layer positioned thereon, and the inner surface of the collar.

When the collar is in its second, expanded condition, an annular volume may be defined between the outer surface of the collar and the inner surfaces of the walls of the pipe sections. The collar may be configured to define at least one annular barrier between the joining sleeve and an inner surface of a pipe section. For example, where the collar comprises formations, inward facing walls of the formations may define an annular barrier. Preferably, the outer surface of the collar, is positioned inward of the location of a weld such that upon welding, the outer surface of the collar, in a volume defined by the formations, may capture and contain a resultant weld pool.

The collar material may comprise a metal and/or may comprise a metal alloy. The collar may comprise a refractory metal, such as titanium or molybdenum, and/or may comprise an alloy of a refractory metal. The collar may comprise stainless steel. The collar may be formed from a material which is capable of withstanding temperatures of at least 1200° C.

The collar may be provided with a layer of insulation, which may be on the outer surface of the collar. The layer of insulation may be formed from a fibrous material.

The sleeve may further comprise a retaining device, which functions to retain the collar in its first, retracted condition. The retaining device may be actuable and/or releasable to enable the collar to move to its second, expanded condition.

The retaining device may be configured to be actuated and/or released actively (for example, manually or by use of a tool, which may be prior to a welding operation), or may be configured to be actuated and/or released passively during welding operations (for example, upon application of heat). The retaining device may be actuated and/or released by being broken, ruptured or removed. The retaining device may be actuated after installation of the sleeve, internally between the two pipe sections to be joined.

The retaining device may be provided in the form of a length of elongated material, which may be wrapped around the retracted collar. The elongated material may comprise a polymer material, such as polyethylene. A free end of the elongated material may be accessible through a gap between two pipe sections to be welded.

Alternatively, the retaining device may be provided in the form of a band formed from a "heat shrink" material.

The retaining device may be provided with at least one protruding member, which may be arranged to project out of a gap between the ends of two pipe sections. The at least one protruding member may be of a particular axial size, and may be configured to abut the pipe sections, in order to define the size of the gap between the pipe sections.

Alternatively, the retaining device in the form of a removable peg or pin. Where this is the case, overlapping sections of material of the collar may be provided with respective holes, which may align with one another when the collar is in its first, retracted condition to receive the peg or pin. The peg or pin may comprise a protruding section which may be arranged to project out of a gap between the pipe sections.

The sleeve may further comprise a protective film which may be disposed over the insulating layer (where provided), and under the collar. Alternatively, the protective film may be provided over both the insulating layer (where provided) and the collar. The protective film may be in the form of a thin "heat shrink" tubular layer, which may be of an initial size suitable to position it over and around the body and the insulating layer and/or the collar, and which may be heat shrunk into a close contact fit with the body and the insulating layer and/or the collar. The protective film may be formed from a polymer. The protective film may function to protect the insulating layer and/or the collar from damage and contamination upon transportation and installation of the sleeve, and may be ruptured upon initiation of the welding operation due to the high temperatures generated.

Where the protective film over the collar, the protective film may also function as a retaining device. The protective film may be disposed over the collar and may be configured to retain the collar in its first, retracted condition. The protective film may be configured to be actuated and/or released by being broken, ruptured or removed during a welding operation.

The configuration and dimensions of the sleeve may be optimised in relation to the configuration and dimensions of the internally lined pipes to be joined, and/or in relation to the desired result.

The joining sleeve may have a longitudinal axis, and in a longitudinal direction of the joining sleeve, the outer diameter of the sleeve body may be reduced towards one or both of its first and second ends. The reduction in outer diameter towards both ends of the sleeve may be gradual. Alternatively, the reduction in outer diameter towards one or both ends of the sleeve may be a step change. The sleeve body may define one or more end-facing circumferential shoulders, which may be upstanding from the reduced outer diameter of the sleeve body. Each end facing shoulder may define an abutment surface. The abutment surface defined at each end of the body of the sleeve may be configured to abut with a respective end of an internal liner, when the joining sleeve is disposed in respective ends of the pipe sections. The reduced outer diameter portions at each end of the tubular body of the sleeve may be configured to be received inside the internal liners. These sections may be referred to herein as the liner interface surfaces of the sleeve. The inner diameter of the body may be uniform throughout.

The reduced outer diameter portions at each end of the tubular body of the sleeve may define liner interface surfaces, and/or may be coated with an adhesive, such that they adhere to the liners of the internally lined pipe sections. Use of an adhesive may prevent the sleeve from moving with respect to the internally lined pipe sections during installation. In alternative embodiments, adhesive may be omitted from the liner interface surfaces.

The joining sleeve may comprise one or more rings positioned adjacent the location at either end of the sleeve where the abutment surfaces of the sleeve abut with the end of each rebated internal liner. The rings may be concentric with the sleeve, and may extend radially outward from the liner interface surfaces. The rings may function to provide some axial compliance or cushioning in the assembly of the sleeve with the liners.

Alternatively, or in addition, the abutment surfaces defined at each end of the body of the sleeve may be coated with an adhesive, such that they adhere to the ends of each rebated internal liner of each of the internally lined pipe sections, respectively, which may prevent the sleeve from moving with respect to the internally lined pipe sections during installation.

In alternative embodiments, adhesive may be omitted from the liner interface surfaces.

According to a second aspect of the invention, there is provided a method for connecting the internal liners of two internally lined pipe sections in a pipe welding operation, the method comprising:

providing a joining sleeve having a sleeve body and a collar positioned around an outer surface of the sleeve body, the collar in a first retracted position having a first outer diameter; locating the joining sleeve in a pipe section joint, such that first and second ends of the sleeve body couple with opposing ends of first and second internal liners respectively, and such that the collar is disposed proximate the weld location;

causing the collar to move to a second expanded condition in which it has a second outer diameter, larger than the first outer diameter.

The joining sleeve may further comprise a retaining device which may be configured to retain the collar in its first, retracted condition and which may be actuable and/or releasable to enable the collar to move to its second, expanded condition. The method may comprise actuating and/or releasing the retaining device to allow the collar to move to its second, expanded condition.

The method may comprise welding the two pipe sections.

Embodiments of the second aspect of the invention may include one or more features of the first aspect of the invention or its embodiments, or vice versa.

According to a third aspect of the invention, there is provided a joining sleeve configured to connect internal liners of two internally lined pipe sections across a welded pipe section joint, the joining sleeve comprising:

a sleeve body comprising a first end and a second end, the first and second ends configured to couple with opposing ends of first and second internal liners respectively; and wherein the joining sleeve has a first retracted condition in which it has a first outer diameter, and a second expanded condition in which it has a second outer diameter, larger than the first outer diameter, and wherein in its second outer condition, an air gap is defined between an outer surface of the joining sleeve and the sleeve body.

Embodiments of the third aspect of the invention may include one or more features of the first or second aspects of the invention or their embodiments, or vice versa.

According to a fourth aspect of the invention, there is provided a method for connecting the internal liners of two internally lined pipe sections in a pipe welding operation, the method comprising:

providing a joining sleeve having a sleeve body;

locating the joining sleeve in a pipe section joint, such that first and second ends of the sleeve body couple with opposing ends of first and second internal liners respectively;

causing the joining sleeve to move to a second expanded condition in which it has a second outer diameter, larger than the first outer diameter, and in which an air gap is defined between an outer surface of the joining sleeve and the sleeve body.

Embodiments of the fourth aspect of the invention may include one or more features of the first to third aspects of the invention or their embodiments, or vice versa.

According to a fifth aspect of the invention, there is provided a joining sleeve configured to connect internal liners of two internally lined pipe sections across a welded pipe section joint, the joining sleeve comprising:

a sleeve body comprising a first end and a second end, the first and second ends configured to couple with opposing ends of first and second internal liners respectively; and wherein the joining sleeve has a first retracted condition in which it has a first outer diameter, and a second expanded condition in which it has a second outer diameter, larger than the first outer diameter, and wherein in its second outer condition, the joining sleeve defines at least one annular barrier between the joining sleeve and an inner surface of a pipe section.

The at least one annular barrier may be a partial annular barrier. Alternatively, it may be a full annular barrier between an outer surface of the joining sleeve and the inner surface of the pipe section.

Embodiments of the fifth aspect of the invention may include one or more features of the first to fourth aspects of the invention or their embodiments, or vice versa.

According to a sixth aspect of the invention, there is provided a method for connecting the internal liners of two internally lined pipe sections in a pipe welding operation, the method comprising:

providing a joining sleeve having a sleeve body;

locating the joining sleeve in a pipe section joint, such that first and second ends of the sleeve body couple with opposing ends of first and second internal liners respectively;

causing the joining sleeve to move to a second expanded condition in which it has a second outer diameter, larger than the first outer diameter, and in which the joining sleeve defines at least one annular barrier between the joining sleeve and an inner surface of a pipe section.

Embodiments of the sixth aspect of the invention may include one or more features of the first to fifth aspects of the invention or their embodiments, or vice versa.

According to a further aspect of the invention, there is provided a pipeline comprising two internally lined pipe sections joined by a welded pipe section joint, and a joining sleeve according to the first, third or fifth aspects of the invention connecting first and second internal liners of the respective pipe sections.

BRIEF DESCRIPTION OF THE DRAWINGS

There will now be described, by way of example only, various embodiments of the invention with reference to the drawings, of which.

DETAILED DESCRIPTION OF PREFERRED EMBODIMENTS

Referring firstly to FIGS. 1A to 4B, there is shown generally at 10 a joining sleeve for connecting the ends of two internally lined pipe sections in welding operations according to an embodiment of the invention. FIG. 1B is a sectional view through the top half of part of the sleeve and part of a pipe section. The joining sleeve is shown inserted internally between two mating ends of two internally lined steel pipe sections, 2a, 2b, having glass-epoxy internal liners 4a, 4b, respectively. The liners 4a, 4b are spaced apart from the inner surfaces of the steel pipe sections 2a, 2b respectively by a layer of grout 3. The layer of grout (or cement) accounts for differences in the rates of thermal expansion of the pipe sections 2a, 2b and the liners 4a, 4b. For example, if a pipe section were to undergo thermal expansion at a different rate from a liner, the liner could be damaged if it was coupled directly to the pipe section. The liners 4a, 4b are rebated from the end of the pipe sections such that they do not extend all the way to the end of the pipe sections, and such that the end of each pipe section extends beyond its respective internal liner. As such, a gap exists between the end of the liner 4a and the end of the pipe section 2a, generally indicated by the distance A. As each liner is separated from the end of each pipe section, the liners will not be subjected to the extreme high temperatures which are experienced during the welding operation between the ends of the pipe sections. In this embodiment, a weld gap 5 is left between the two pipe sections 2a, 2b.

Figure 1A:
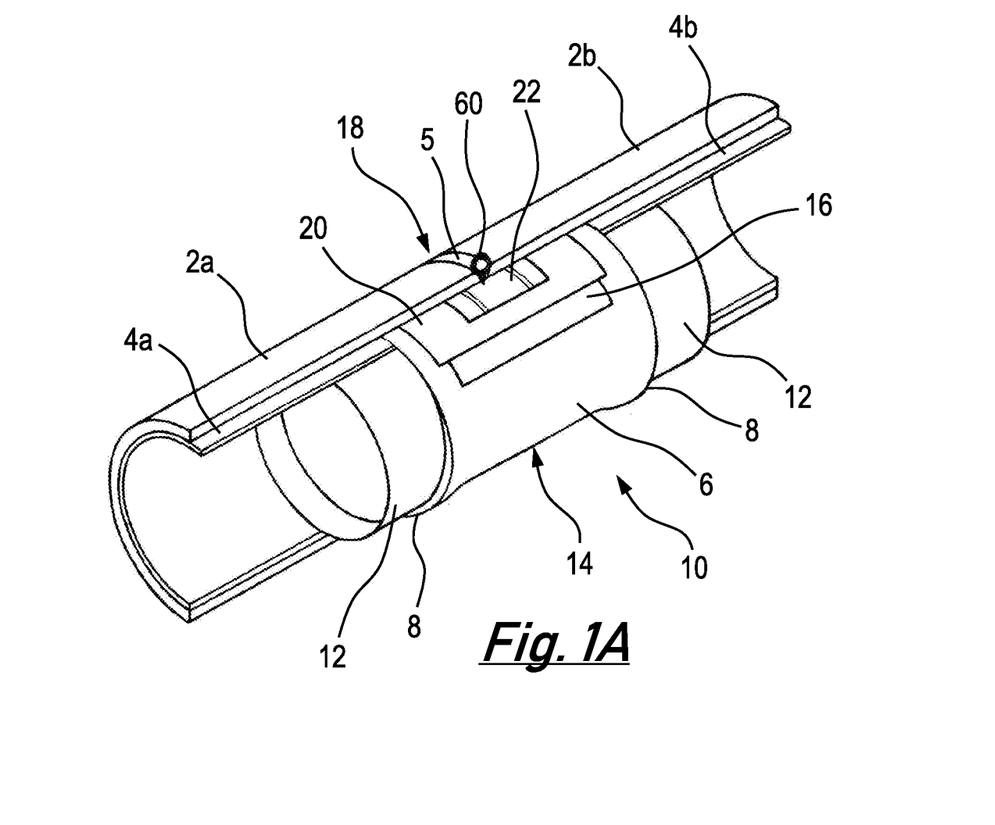
FIG. 1A is perspective view of a sleeve according to an embodiment of the invention installed between two lined pipe sections, with some parts omitted or shown in part for clarity.
Figure 1B:
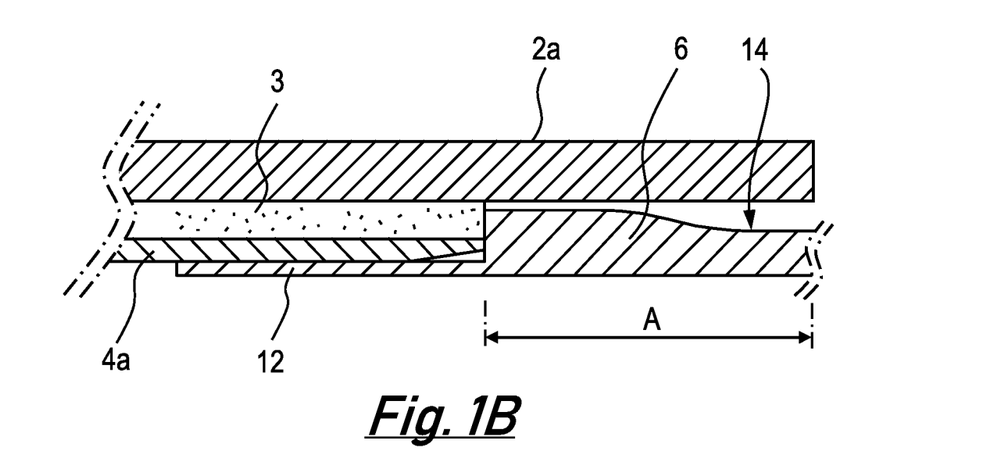
FIG. 1B is a part-sectional view through the sleeve of FIG. 1A.

The sleeve comprises a substantially tubular body 6 having reduced outer diameter sections 12 towards each of its ends. A step change in the outer diameter of the body defines a pair of circumferential abutment shoulders 8. These shoulders 8 abut with the internal liners 4a, 4b, of the pipe sections 2a, 2b, when the sleeve is installed.

The reduced outer diameter portions 12 at each end of the body 6—referred to herein as the liner interface surfaces of the sleeve—are disposed inside the internal liners 4a, 4b, of the pipe sections 2a, 2b. There is a close fit between the liners 4a, 4b and the liner interface surfaces 12, which optionally are bonded to one another by a suitable adhesive, if required to prevent movement of the sleeve with respect to the liner and pipe section during installation.

The body 6 comprises a circumferential recess about its axial centre. A layer of insulating material 16 is positioned within the recess 14. Only a small portion of insulating material 16 is shown in FIG. 1A, but it will be appreciated that this layer surrounds the entire circumference of the body 6, about the axial centre of the body 6. As such, the layer of insulating material 16 is located directly beneath the location of the weld between the pipe sections 2a, 2b, shown generally at 18, which extends by a distance in an axial direction of the joining sleeve, either side of the weld location.

The joining sleeve further comprises a collar 22, which is positioned around the centre of the body 6 in a longitudinal direction of the apparatus, including around the insulating layer 16, directly beneath the location of the weld 18.

As shown most clearly in FIGS. 2A to 3C, the collar is formed from a non-continuous or split ring of material, with an overlapping section 23 formed by the end sections of the collar material overlapping around the circumference of the collar. The overlap is in the form of a joggle lap, which is shown in more detail in the enlarged view of FIG. 2C, in which one end section of the collar material is offset (by two bends 25) to enable it to be positioned inside the opposing end section of material, and to provide for an overlap. This results in a collar which has a substantially flush outer surface.

In this embodiment of the invention, the overlapping section of material accounts for the variable diameter of the collar. In its first, retracted condition, the overlap in the is large, to effect a reduced outer diameter collar and in its second, expanded condition, the overlap in the collar material is reduced to effect a second, larger outer diameter of the collar.

Figure 2A:
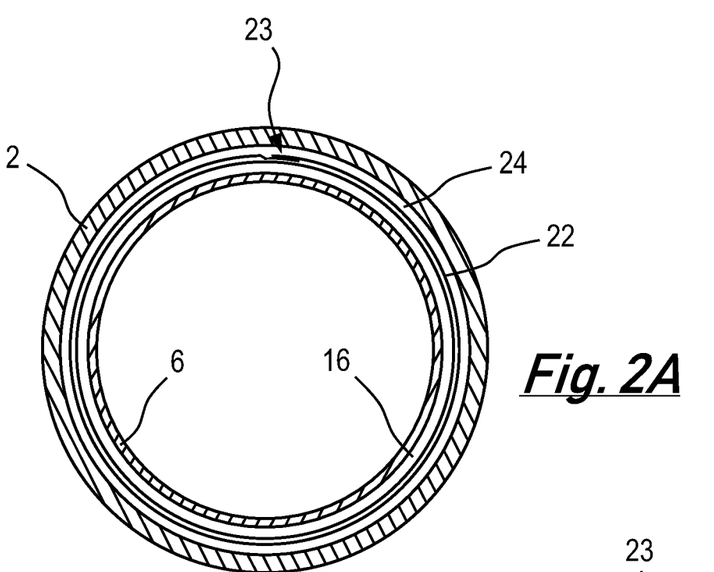
FIGS. 2A and 2B are transverse cross-sectional views through the sleeve of FIG. 1A, installed within the pipeline.
Figure 2B:
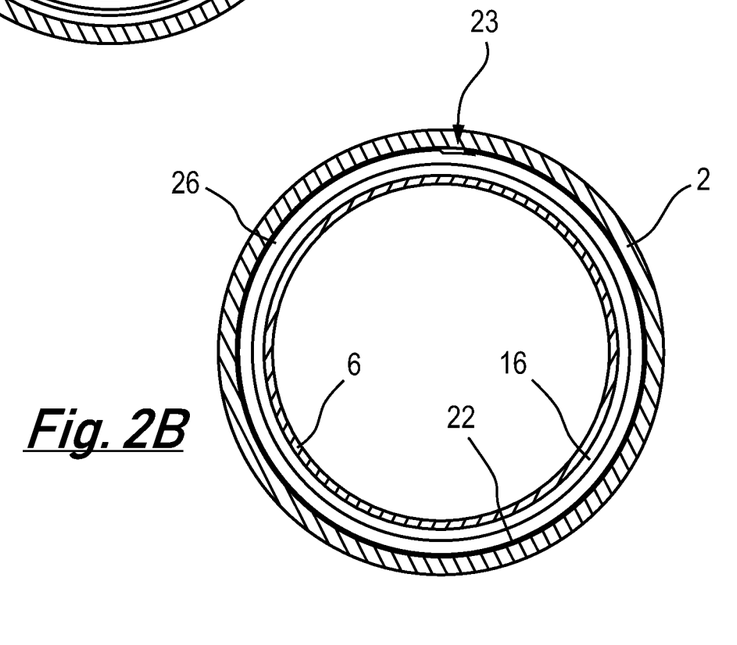
Figure 2C:
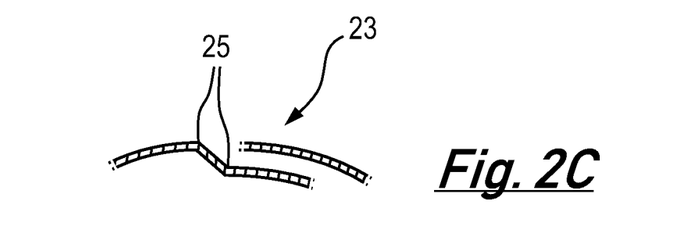
FIG. 2C is an enlarged view of part of the collar, of the sleeve of FIGS. 2A and 2B.

When the collar 22 is in its first, retracted condition, it has an outer diameter which is less than that of the inner diameter of the pipe sections 2, such that an area of clearance 24 exists between the collar 22 and the pipes 2 as the collar is installed within the pipe sections. The collar 22 is maintained in its first, retracted condition by a retaining device (not shown). The collar retaining device, and alternative examples of collar retaining devices, as well as their features and functionality, are described with reference to FIGS. 6A, 6B, 7, and 8 below. In this condition, the outer diameter of the collar 22 is close to the outer diameter of the body 6 of the sleeve Before or during the welding operation, the collar 22 is caused to move to its second, expanded condition as shown in FIG. 2B. In its second, expanded condition, at least part of the collar comes into contact with the inner surfaces of the pipe sections 2, and an air gap 26 is produced between the collar 22 and the body 6 of the sleeve, including the insulation layer 16. The air gap 26 is advantageous as it provides further insulation between the high temperatures generated during the welding operation and the sleeve. This provides additional thermal protection to the sleeve, including the insulating layer 16 on the sleeve, and also to the liners of the pipe sections. Another benefit of this configuration is that the provision of additional insulation does not require a reduction in size of the internal bore of the pipeline, or an increase in outer diameter during the installation procedure. As such, a better insulated joining sleeve is produced, which does not impede normal operation of the pipeline, and which is relatively simple to install.

Figure 3A:
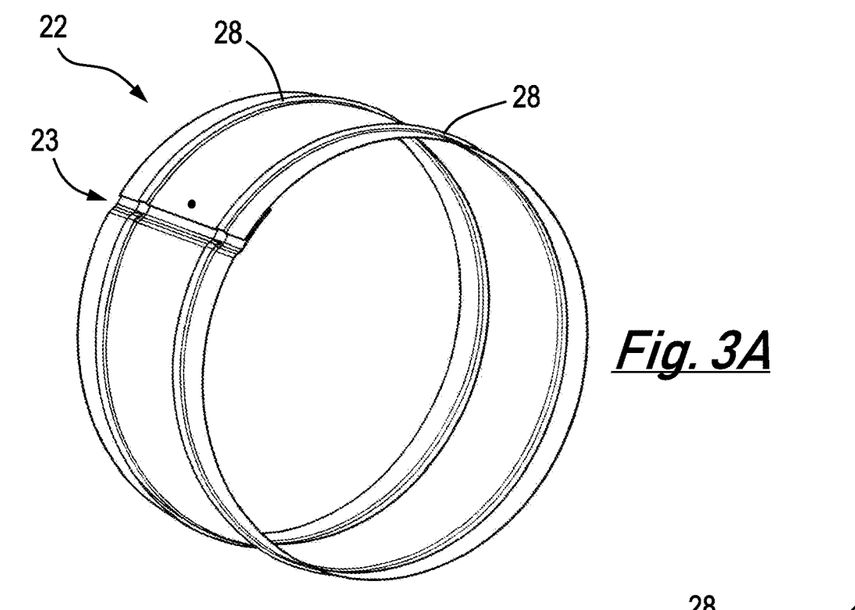
FIGS. 3A and 3B are perspective views of a collar according to an embodiment of the invention, in a first, retracted condition and a second, expanded condition, respectively.
Figures 3B, 3C:
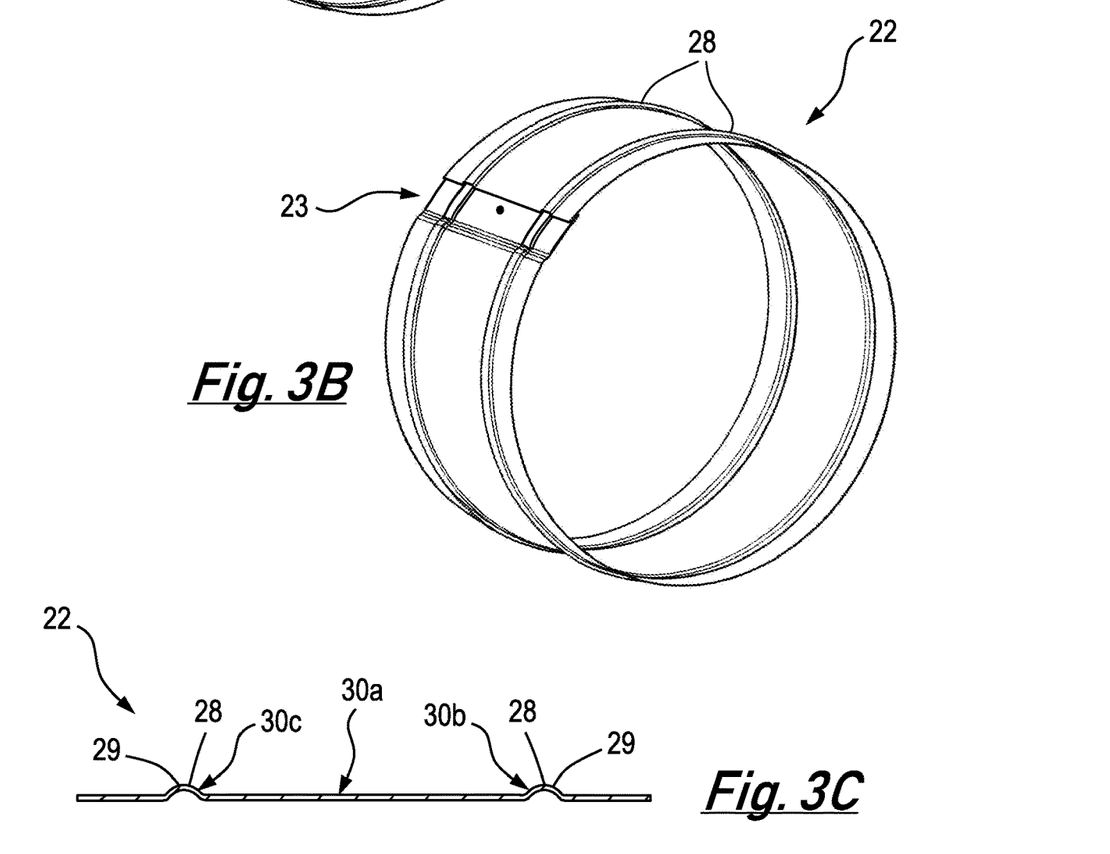
FIG. 3C is a cross-sectional view through the collar of FIGS. 3A and 3B.

As shown most clearly in FIGS. 3A to 3C, the collar 22 comprises two circumferentially extending formations in the form of grooves 28, which are spaced apart in a longitudinal direction of the sleeve. In the overlapping section of the collar 23 the outer surfaces of the grooves 28 of the underlapping section of material sit within the inner surfaces of the grooves 28 of the overlapping section of material to facilitate alignment of the two ends of collar material with itself in the overlapping section 23. This feature also assists in providing the collar with additional radial stiffness. Alternative embodiments of the invention may comprise a single formation, or greater than two formations extending from the collar.

When the collar is in its second, expanded condition, the tops 29 of the grooves 28 are the only parts of the collar which come into contact with the inner wall of the pipe sections (not shown), such that an annular volume is defined between the central outer surface of the collar 30a and the inward facing walls 30b, 30c of the circumferentially extending grooves 28. The outer surface of the collar 30a, between the circumferentially extending grooves 28, is positioned on the sleeve in a location which is directly beneath the location of the prospective weld between the pipeline sections. Upon welding, the annular volume defined between the collar 22 and the pipeline sections (not shown) captures and contains the resultant weld pool. Therefore, the body of the sleeve itself (including the insulating layer, the sleeve body and/or all or some of the other components of the sleeve) and/or the internal liners of the pipe sections, are protected from the weld pool and the high temperatures associated with the welding process.

Figure 4A:
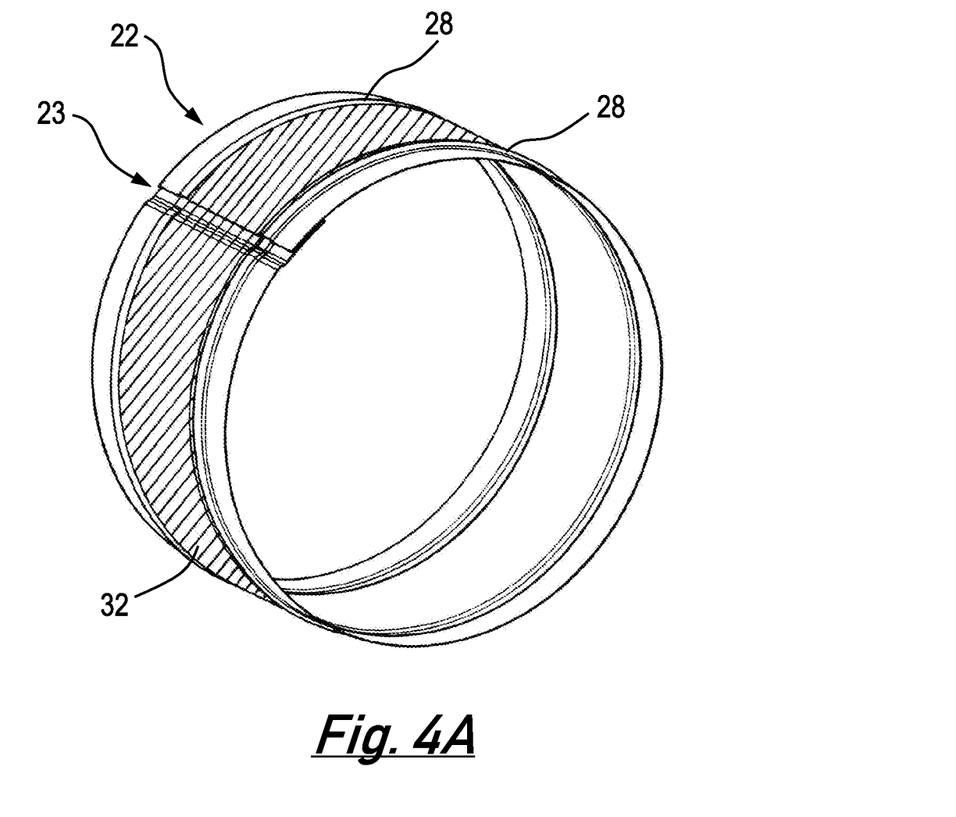
FIG. 4A is a perspective view of a collar according to an alternative embodiment of the invention.
Figure 4B:
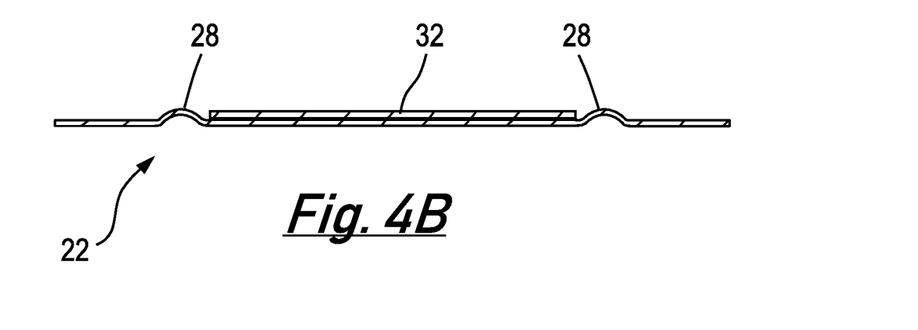
FIG. 4B is a cross-sectional view through the collar of FIG. 4A.

The collar may optionally be provided with a further additional layer of insulation as shown in FIGS. 4A and 4B. The additional layer of insulation may be positioned upon the outer surface of the collar, between the two circumferentially extending grooves 28.

Figure 5:
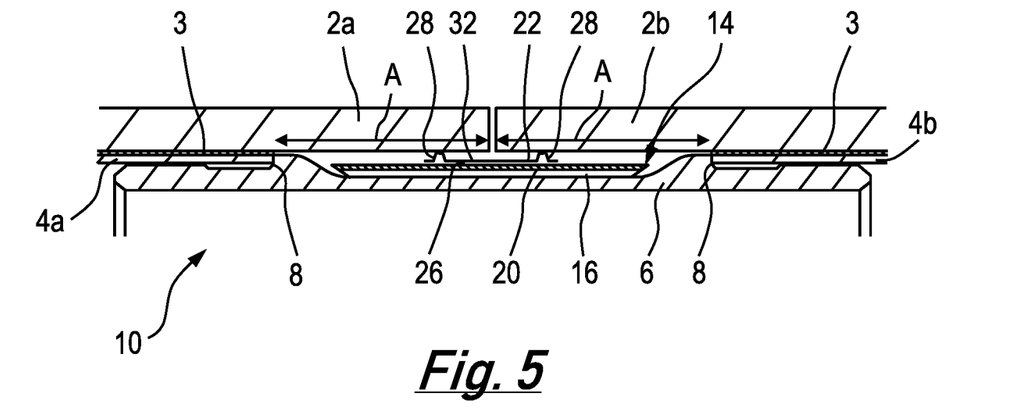
FIG. 5 is a cross-sectional view through one longitudinal half of the sleeve of FIG. 1A, installed within the pipeline.

The installation and operation of the sleeve will now be described with reference to FIG. 5, which shows a cross sectional view of the top half of the sleeve 10, installed within the pipe sections 2a, 2b, with the collar 11 in its second, expanded condition.

Before installation of the sleeve, the collar 22 is initially in its second, expanded condition, which enables it to be initially positioned around the tubular body 6 of the sleeve 10. Before installation of the sleeve 10 within the pipe sections 2a, 2b, the collar 22 is brought into and retained in its first, retracted condition using a retaining device in the form of a pin, which is described in more detail with reference to FIGS. 6A and 6B. In this condition, the collar sits snugly around the body of the sleeve 10.

With the collar 22 in place, and with the collar 22 in its first, retracted condition, the sleeve 10 is inserted inside the mating ends of the two internally lined pipe sections. Prior to this, an adhesive may optionally be applied to the liner interface surfaces 12 and/or the abutment shoulders 8 such that they adhere to the liners 4a, 4b of the internally lined pipe sections, if necessary to prevent the sleeve 10 from moving with respect to the internally lined pipe section or sections during insertion.

The sleeve is located into the ends of the pipe sections 2a, 2b by bringing the pipe sections together, until the abutment surface 8 at each end of the sleeve comes into abutment with the end of each rebated internal liners 4a, 4b.

After location of the sleeve 10 inside the mating ends of the two internally lined pipe sections 2a, 2b, with the collar 22 in its first, retracted condition, the collar 22 is released by the retaining device such that it is permitted to move into its second, expanded condition either prior to, at the start of, or during the welding operation. In its second, expanded condition, the tops of the grooves 28 of the collar 22 come into contact with the inner walls of the pipe section 2a, 2b, to define a volume therebetween.

Once in position, the joining sleeve connects the internal liners 4a, 4b of the pipe sections, by providing a bridge between them. The thermal insulating layer reduces heat transfer to the body of the sleeve and to the liners. In addition, the collar 22 acts to contain the weld pool produced during the welding operation in annular volume 32. The weld pool is therefore kept separated from the insulating layer 16 of the sleeve so that it cannot cause damage to the sleeve body, the insulation later, and the internal liners 4a, 4b. In addition, in its second, expanded condition an air gap 26 is formed between the collar 22 and the body of the sleeve 6 (including insulating layer 16), which provides additional insulation and protection from the heat produced during the welding operation. The combination of the thermal insulation effects provided by the air gap 26 and the insulating layer 16 provides the body of the sleeve with increased protection against the heat of the weld operation, and provides reliable protection to the liners 4a, 4b. In addition, the provision of two sources of thermal insulation adds as element of redundancy to the sleeve. That is, if one of the sources of insulation is to fail, or underperform, the other is still in place to provide protection.

Figure 6A:
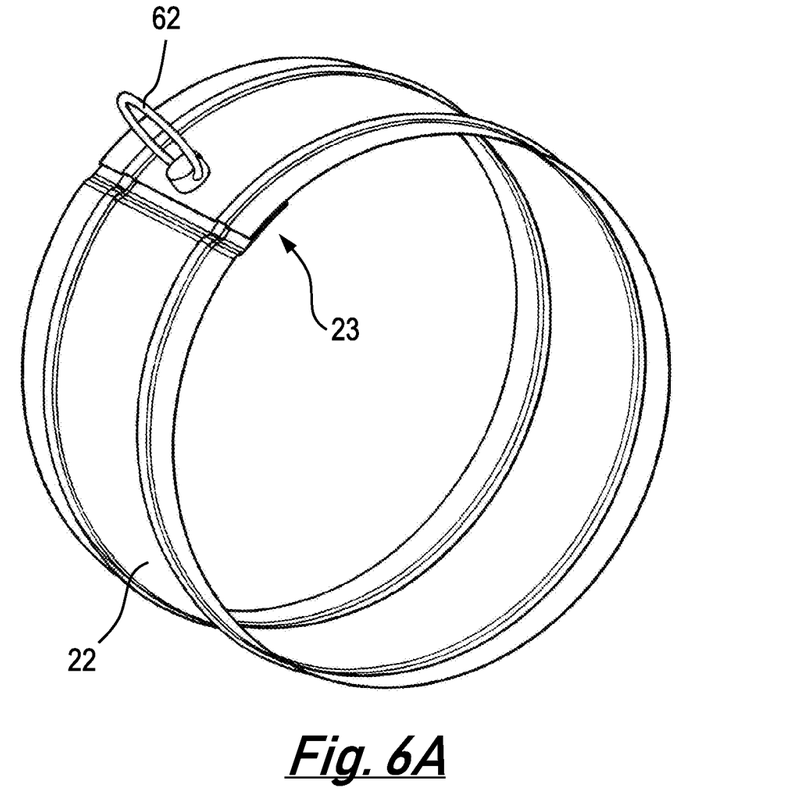
FIG. 6A is a perspective view of the collar, and a collar retaining device according to an embodiment of the invention.
Figure 6B:
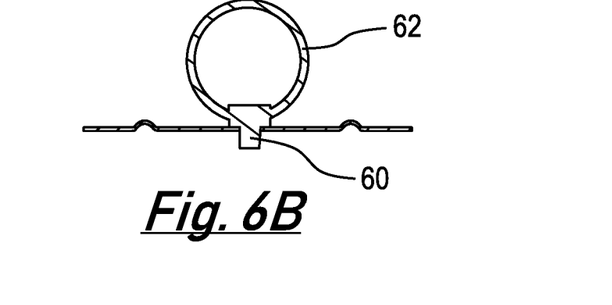
FIG. 6B is a cross-sectional view through the collar and the collar retaining device of FIG. 6A.

Referring now to FIGS. 6A and 6B, the collar retaining device is shown. The retaining device is provided in the form of a pin 60 and handle 62. The overlapping sections of collar material 23 are provided with two corresponding holes (not shown), which align with one another when the collar 22 is in its first, retracted condition, as is shown in FIGS. 6A and 6B. The pin 60 is inserted through the holes to retain the collar in its first, retracted condition.

After insertion of the sleeve, the handle 62 of the pin 60 protrudes from the gap between the mating ends of the two internally lined pipe sections. After the sleeve has been inserted, but before the welding operation takes place, the handle 62 of the pin 60 may be pulled, to allow the collar to move into its second, expanded condition.

The handle 62 of the pin 60 is designed to be of a particular size, which corresponds to the size of the desired weld gap. This allows the size of the gap between the mating ends of the two internally lined pipe sections to be controlled, depending upon the requirements welding operation to be performed.

Figure 7:
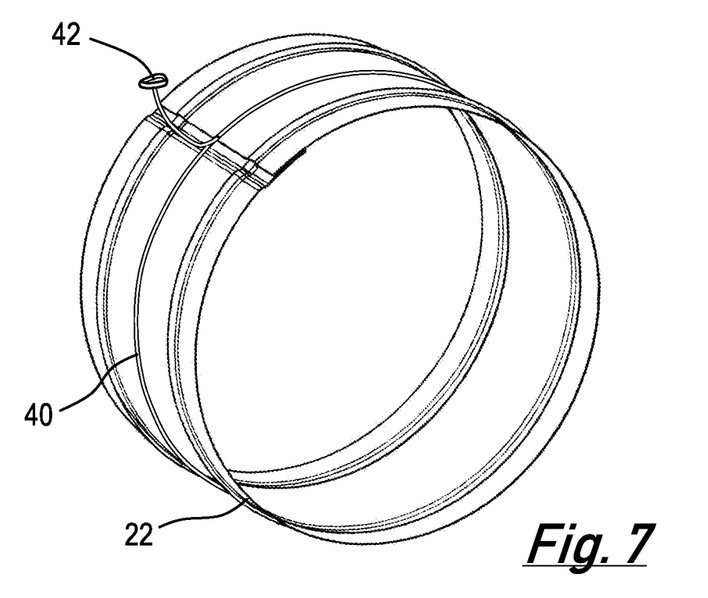
FIG. 7 is a perspective view of the collar, and a collar retaining device according to an alternative embodiment of the invention.

A collar retaining device according to an alternative embodiment of the invention is shown in FIG. 7. The retaining device is a length of polymer string 40 which is wrapped around the collar 22. Upon insertion of the sleeve into the pipe sections, the free end of the string 42 is arranged to project out of the gap between the mating ends of the two internally lined pipe sections. After the sleeve has been inserted, but before the welding operation takes place, the free end 42 of the string 40 is pulled to release its hold on the collar, allowing the collar to move into its second, expanded condition.

Figure 8:
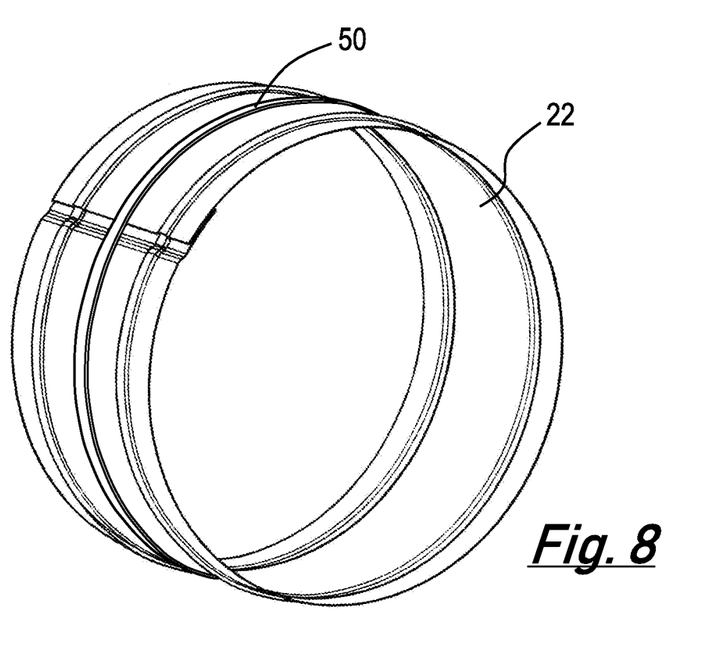
FIG. 8 is a perspective view of the collar, and a collar retaining device according to an alternative embodiment of the invention.

FIG. 8 shows yet a further alternative collar retaining device, according to an embodiment of the invention. The device is in the form of a polymer band 50, which is wrapped around the collar in its first, retracted condition. The band is continuous, and formed from a heat-shrinking material, and is initially made large enough to surround the collar 22 in its second, expanded condition. The band is subsequently heat-shrunk to retract the collar. The heat which is generated by the start of the welding process ruptures the band 50, allowing the collar 22 to move into its second, expanded condition for the duration of the rest of the welding operation. The band 50 is located as close to the location of the prospective weld as possible to ensure that that the temperatures required to rupture the band are experienced at the beginning of the welding operation so that the collar 22 can expand and perform its function.

Figure 9:
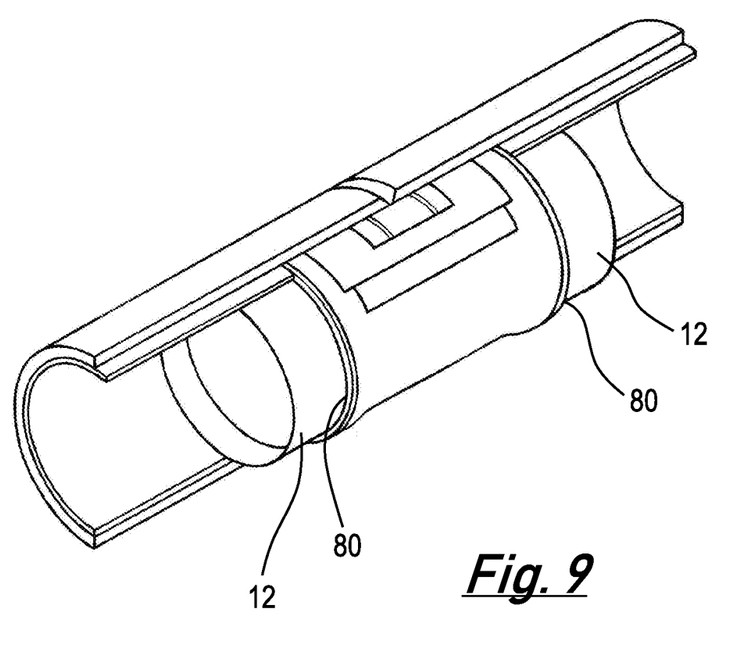
FIG. 9 is a perspective view of a sleeve according to an alternative embodiment of the invention installed between two lined pipe sections, with some parts omitted or shown in part for clarity.

FIG. 9 shows an alternative embodiment of the tubular body, in which the liner interface surfaces 12 are provided with rings 80. Each ring 80 is positioned adjacent the location at either end of the sleeve where the abutment surfaces of the sleeve abut with the end of each rebated internal liner. The rings 80 are concentric with the sleeve, and extend radially outward from the liner interface surfaces 12. The rings 80 of this embodiment are formed from a polymer such as polytetrafluoroethylene, and function to provide some axial compliance or cushioning in the assembly of the sleeve with the liners. This has the effect of compensating for engineering tolerances in the sleeve and liners, and restricting fluid transfer from a main bore of the pipeline to the exterior of the sleeve and liners. Consequently, the rings restrict the passage of corrosive fluids, and function as corrosion barrier rings. However, the rings are not designed to provide an entirely fluid tight seal. If a high pressure differential is experienced within the pipeline, the rings allow some fluid transfer to take place to protect the sleeve from failing due to exposure to high internal pressure. In the event that a small amount of fluid passes the rings during operation, it will flow to the connection area between the sleeve and the pipeline sections. It may then be able to permeate the cement or grout which separates the liners from the inner surfaces of the pipeline sections, until the pressure in the cement or grout is brought into equilibrium with the bore of the main pipeline. This prevents a large pressure differential build up behind the liners and reduce any risk of the liners collapsing.

In an alternative embodiment of the invention, an optional layer of protective film 20 (FIG. 1A) is provided around the insulating layer 16. The layer is in the form of a heat-shrink tube. The heat-shrink tube is shown in its shrunken state, in close contact with the insulating layer 16. This film 20 functions to protect the insulating layer 16 from damage, during the transportation, handling and installation of the sleeve 10. The film is sacrificial, and the temperatures generated during the welding process are sufficient to rupture and/or deplete the film 20. To be assembled on the sleeve, the heat-shrink tube must initially be of sufficiently large diameter to allow it to be positioned around the outside of the tubular body 6 of the sleeve 10. It is then heat-shrunk into a close contact fit with the insulation layer and sleeve body.

Instead of being positioned between the insulating material 16 and the collar 22, the protective film 20 may be positioned over both the insulating material 16 and the collar 22. In this configuration, according to an embodiment of the invention, the protective film 20 may additionally function as the retaining device for the collar 22. For example, when it is positioned over the collar 22, it is able to retain the collar in its first, retracted condition and can be actuated to release the collar 22 to allow it to move into its second, expanded condition. The protective film 20 releases the collar 22 when it is ruptured due to the high temperatures experienced as a result of the welding operation beginning.

Although in the foregoing description the collar is described as being a non-continuous or split ring of material to allow for expansion of the collar, it will be appreciated that other suitable types of expanding collar may be provided in alternative embodiments of the invention, including continuous rings or collars which may expand in another way. For instance the collar could be made with a ±45° woven fabric or trellis construction, able expand in the radial direction while contracting in the longitudinal direction.

The invention in one aspect provides a joining sleeve configured to connect internal liners of two internally lined pipe sections across a welded pipe section joint and a method of use. The joining sleeve comprises a sleeve body having a first end and a second end, the first and second ends configured to couple with opposing ends of first and second internal liners respectively. A collar is disposed around the outer surface of the sleeve body, the collar having a first retracted condition in which it has a first outer diameter, and a second expanded condition in which it has a second outer diameter, larger than the first outer diameter.

Various modifications to the above-described embodiments may be made within the scope of the invention, and the invention extends to combinations of features other than those expressly claimed herein.

The invention claimed is:

1. A joining sleeve configured to connect internal liners of two internally lined pipe sections across a welded pipe section joint, the joining sleeve comprising:
   a sleeve body having a first end and a second end, the first and second ends configured to couple with opposing ends of first and second internal liners respectively; and
   a collar disposed around and radially outward of an outer surface of the sleeve body, the collar having a first retracted condition in which it has a first outer diameter, and a second expanded condition in which it has a second outer diameter, larger than the first outer diameter, wherein the collar is configured to protect the sleeve body and the first and second internal liners during a welding operation to form the weld pipe section joint;
   wherein the collar comprises a split ring comprising respective ends which overlap in a circumferential direction of the collar; and
   wherein a gap is produced between the outer surface of the joining sleeve body and the inner surface of the collar when the collar is in its second, expanded condition.

2. The joining sleeve according to claim 1, wherein the joining sleeve comprises an insulating layer which comprises a layer of thermally insulating material disposed around at least a portion of the outer surface of the sleeve body, and wherein the collar at least partially overlays the insulating layer.

3. The joining sleeve according to claim 1, wherein the collar comprises a joggled section of material such that a first end section of the collar is radially offset with respect to a second end section of the collar.

4. The joining sleeve according to claim 1, wherein the collar is biased towards its second, expanded condition.

5. The joining sleeve according to claim 1, wherein the first outer diameter of the collar is smaller than an inner diameter of the pipe sections, such that the collar does not come in to substantial contact with inner surfaces of the pipe sections in its first retracted condition.

6. The joining sleeve according to claim 1, wherein the collar has a state of equilibrium in which it has a diameter which is greater than the inner diameter of the pipe sections, such that the collar exerts a force on the inner surfaces of the pipe sections when it is in its second, expanded condition.

7. The joining sleeve according to claim 1, wherein the collar comprises at least one formation.

8. The joining sleeve according to claim 7, wherein at least one formation is configured to engage respective ends of the split ring collar together.

9. The joining sleeve according to claim 8, wherein an outer surface of the at least one formation is configured to locate in an inner surface of the at least one formation at the overlap of collar material.

10. The joining sleeve according to claim 7, wherein the at least one formation is configured to come into contact with the inner surfaces of the pipe sections when the collar is in its second, expanded condition, such that a gap is present between the outer surface of the collar and the inner surfaces of the pipe sections.

11. The joining sleeve according to claim 7, wherein the at least one formation comprises a groove.

12. The joining sleeve according to claim 11, wherein the groove is a continuous groove on a surface of the collar, and wherein an outer surface of the groove of a first end of the respective ends of the collar is configured to locate in an inner surface of the groove of a second end of the respective ends of the collar.

13. The joining sleeve according to claim 1, comprising a retaining device configured to retain the collar in its first, retracted condition, the retaining device being actuable and/or releasable to enable the collar to move to its second, expanded condition.

14. The joining sleeve according to claim 13, wherein the retaining device is configured to be actuated and/or released actively prior to a welding operation.

15. The joining sleeve according to claim 13, wherein the retaining device is configured to be actuated and/or released passively during a welding operation.

16. The joining sleeve according to claim 13, wherein the retaining device is provided with at least one protruding member which is arranged to abut the ends of the two pipe sections and project from a gap therebetween.

17. The joining sleeve according to claim 1, comprising a protective film disposed over the sleeve body and/or the collar, wherein the protective film is configured to be broken, ruptured or removed during a welding operation.

18. The joining sleeve according to claim 1, wherein the collar comprises a layer of insulation on an outer surface of a collar.

19. A method for connecting the internal liners of two internally lined pipe sections in a pipe welding operation, the method comprising:
  providing a joining sleeve having a sleeve body and a collar configured to protect the sleeve body and internal liners of the pipe sections during the pipe welding operation positioned around and radially outward of an outer surface of the sleeve body, the collar comprising a split ring comprising respective ends which overlap in a circumferential direction of the collar, and the collar being in a first retracted condition having a first outer diameter;
  locating the joining sleeve in a pipe section joint, such that first and second ends of the sleeve body couple with opposing ends of first and second internal liners respectively, and such that the collar is disposed proximate the weld location;
  causing the collar to move to a second expanded condition in which it has a second outer diameter, larger than the first outer diameter;
  wherein a gap is produced between the outer surface of the joining sleeve body and the inner surface of the collar when the collar is in its second, expanded condition.

20. The method according to claim 19, wherein the joining sleeve further comprises a retaining device which is configured to retain the collar in its first, retracted condition and which is actuable and/or releasable to enable the collar to move to its second, expanded condition, and wherein the method comprises actuating and/or releasing the retaining device to allow the collar to move to its second, expanded condition.

21. A pipeline comprising two internally lined pipe sections joined by a welded pipe section joint, and a joining sleeve according to claim 1 connecting first and second internal liners of the respective pipe sections.

22. A collar for a joining sleeve, the joining sleeve comprising a sleeve body having a first end and a second end, the first and second ends configured to couple with opposing ends of first and second internal liners respectively to connect two internally lined pipe sections across a welded pipe section joint;
  wherein the collar is configured to be disposed around and radially outward of an outer surface of the sleeve body and protect the sleeve body and the first and second internal liners during a welding operation to form the welded pipe section joint;
  wherein the collar has a first retracted condition in which it has a first outer diameter, and a second expanded condition in which it has a second outer diameter, larger than the first outer diameter;
  wherein the collar comprises a split ring comprising respective ends which overlap in a circumferential direction of the collar; and
  wherein a gap is produced between the outer surface of the joining sleeve body and the inner surface of the collar when the collar is in its second, expanded condition.

* * * * *